(12) United States Patent
Phillips et al.

(10) Patent No.: US 9,721,335 B2
(45) Date of Patent: Aug. 1, 2017

(54) METHOD AND SYSTEM FOR DETERMINING QUALITY OF MARKINGS APPLIED TO FOOD PRODUCTS

(71) Applicant: YTA HOLDINGS, LLC, Los Angeles, CA (US)

(72) Inventors: Jonathan R. Phillips, San Juan Capistrano, CA (US); Richard C. Blackburn, Santa Ana, CA (US)

(73) Assignee: YTA HOLDINGS, LLC, Los Angeles, CA (US)

( * ) Notice: Subject to any disclaimer, the term of this patent is extended or adjusted under 35 U.S.C. 154(b) by 0 days.

(21) Appl. No.: 15/006,064

(22) Filed: Jan. 25, 2016

(65) Prior Publication Data
US 2016/0217561 A1    Jul. 28, 2016

Related U.S. Application Data

(60) Provisional application No. 62/107,484, filed on Jan. 25, 2015.

(51) Int. Cl.
*G06K 9/00* (2006.01)
*G06T 7/00* (2017.01)

(52) U.S. Cl.
CPC .. *G06T 7/0004* (2013.01); *G06T 2207/30128* (2013.01)

(58) Field of Classification Search
CPC .................. G06T 7/0004; G06T 2207/30128
See application file for complete search history.

(56) References Cited

U.S. PATENT DOCUMENTS

| 6,796,241 B2 * | 9/2004 | Catalan | B41F 17/001 101/41 |
| 6,810,796 B2 * | 11/2004 | Catalan | B41F 17/30 101/41 |
| 7,460,921 B2 | 12/2008 | Sullivan | |
| 2001/0055417 A1 | 12/2001 | Vilella | |
| 2002/0011311 A1 * | 1/2002 | Carignan | B65C 9/1869 156/350 |
| 2003/0031357 A1 * | 2/2003 | Wenzel | G06T 7/0004 382/154 |

(Continued)

OTHER PUBLICATIONS

International Search Report from corresponding PCT Application No. PCT/US2016/014779 mailed Mar. 24, 2016 (2 pgs.).

(Continued)

*Primary Examiner* — Gregory M Desire
(74) *Attorney, Agent, or Firm* — Hankin Patent Law, APC; Susan L. Mizer; Anooj Patel

(57) ABSTRACT

The present disclosure includes a method and system for monitoring food product processing operations and facilities. The food products are examined and/or analyzed with respect to the quality and integrity of the processing thereof, any markings applied thereto, and compliance with commercial, regulatory, or customer requirements. The present disclosure provides a machine vision system that is used in connection with the food processing operations to examine and analyze the eggs being processed. In a preferred embodiment, the machine vision system includes at least one imaging sensor for capturing images of the processing thereof and is positioned above the path along which the food products are conveyed.

20 Claims, 11 Drawing Sheets

(56) References Cited

U.S. PATENT DOCUMENTS

| | | | |
|---|---|---|---|
| 2004/0220855 A1* | 11/2004 | Carignan | B65C 9/1869 |
| | | | 705/14.49 |
| 2005/0264590 A1 | 12/2005 | Yong | |
| 2006/0118631 A1 | 6/2006 | Lubow | |
| 2008/0004822 A1 | 1/2008 | Nadabar | |
| 2009/0148002 A1 | 6/2009 | Spitzig | |
| 2013/0000499 A1 | 1/2013 | Ookubu | |
| 2015/0202889 A1* | 7/2015 | Sar-El | B41F 17/001 |
| | | | 347/16 |
| 2015/0226654 A1* | 8/2015 | de Ketelaere | G01N 33/08 |
| | | | 702/43 |
| 2016/0217561 A1* | 7/2016 | Phillips | G06T 7/0004 |

OTHER PUBLICATIONS

Written Opinion of the International Searching Authority from corresponding Application No. PCT/US2016/014779 mailed Mar. 24, 2016 (7 pgs.).

* cited by examiner

METHOD AND SYSTEM FOR DETERMINING QUALITY OF MARKINGS APPLIED TO FOOD PRODUCTS

CROSS REFERENCE TO RELATED APPLICATIONS

This application claims the benefit of U.S. Provisional Application No. 62/107,484 filed on Jan. 25, 2015, the contents of which are incorporated herein by reference in its entirety.

BACKGROUND

The disclosure relates generally to the field of food product processing, and more particularly methods and systems for monitoring food product processing operations and facilities. The disclosure further relates to methods and systems for examining or analyzing the food products with respect to the quality and integrity of the processing thereof and any markings that may be applied to the food products and/or associated packaging. While reference is made herein to eggs in particular, it should be understood that this disclosure is directed to all food processing operations.

In the egg packing industry, eggs typically undergo a great deal of processing before they are ready to be sold to the consuming public. In many circumstances, for example, eggs pass through several processing stations where they are washed, candled, weighed, graded, and packed into packages (e.g., cartons, crates, or other commercially distributed containers). Examples of such processing stations and mechanisms for conveying eggs from station to station are described, for instance, in the following U.S. patents assigned to Diamond Automations, Inc. (U.S. Pat. Nos. 4,189,898; 4,195,736; 4,505,373; 4,519,494; 4,519,505: 4,569,444; 4,750,316; 5,321,491; and 6,056,341) and TEN Media LLC (U.S. Pat. No. 8,455,030), which are incorporated herein by reference in their entirety. As a reference, it is not uncommon for a facility in which these stations operate to output about one million eggs in a single day. Accordingly, to be commercially acceptable, the throughput of the stations needs to be quite high, with some stations typically processing on the order of 20,000 eggs per hour.

The egg packing industry uses devices known as "packers" to pack the eggs into the packages. Typically, a packer includes a conveyor (e.g., a belt conveyor, roller conveyor, chain conveyor, etc.) that moves empty packages through an egg loading section (where the eggs are loaded into the egg loading section from above) and then moves the filled packages to a package closing section that is responsible for closing the lids of the packages. The eggs may be supplied to the egg packer via a grader system.

An egg packing process that uses "packers," typically uses bulk belts to bring eggs from a bulk supply location. The eggs are cleaned or disinfected, in some instances using UV light while clamped to transport chains, and in some instances through immersion in sanitizing wash water. The eggs are then inspected either electronically or manually, they are weighed to establish size, inspected for cracks using ultrasonic inspection and loaded into a chain driven carriage mechanism ("Transfer Loader"). The egg is then normally transported to one of a plurality of packing machines by the aforementioned carriage mechanism. The particular packing machine to which any individual egg may be transported is determined by a computer. This process or elements thereof up to, but not including the packing machine, constitute grading ("Grading" and the "Grader"). The carriage mechanism typically consists of one or a plurality of chains, running the length of the Grader past all the packing machines in the horizontal plane ("Grader Chains"). The packing machines are usually configured with an egg flow perpendicular to the Grader Chain in the horizontal plane.

The egg industry widely uses marking devices to print Size, Grade and Date information together with other information or images and logos ("Data") on to the surface of an egg shell of a fresh egg travelling through an egg grading machine. The marking devices are traditionally placed in a location on the production line that is responsible for grading the eggs and the site for such installation is chosen to minimize the number of marking devices required for a given installation. Marking devices have typically been installed on the Grader Chains as near to the Transfer Loader as practical, and typically (although not always), prior to all the packing machines to which almost all eggs are later diverted.

Due to variances in egg type, size, age, moisture content, and other biological and process factors, the markings applied may not be consistent. As such, the eggs are typically examined or analyzed during and/or after the marking process to determine the position and/or characteristics of the eggs that are to be marked and/or the quality and integrity of the information that is marked on the eggs. For example, a number of regulatory and customer requirements not only specify the contents of markings on products, such as eggs, but also the depth of the marking on the surface. As such, there is a need to systematically and consistently inspect the quality of the markings applied to the eggs.

BRIEF SUMMARY

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with embodiments herein, the present disclosure includes a method and system for monitoring food product processing operations and facilities. The food products are examined and/or analyzed with respect to the quality and integrity of the processing thereof, any markings applied thereto, and compliance with commercial, regulatory, or customer requirements. The present disclosure provides a machine vision system that is used in connection with the food processing operations to examine and analyze the eggs being processed. The environmental conditions, processing conditions, the marking process performance parameters, and the like, or any combination thereof, of the marking process may be adjusted in response to such examination.

In a preferred embodiment, the present disclosure includes a method and system for monitoring food product processing operations, wherein such processing operations include applying markings on the food product. The marking are applied in such a manner to form a permanent marking thereon. The markings may include text, graphics, images, other types of indicia, and any combination thereof. The markings are applied by any suitable marking device known in the art, such as laser-based or ink-based technologies. Desirably, the marking is applied so as to leave much of the area of the food product unaffected so as to form contrast between the unaffected areas and the marking. The method preferably forms the markings on the food product while the product moves through a predetermined region of a food processing system.

In a preferred embodiment, the present disclosure includes an apparatus for applying markings on food products that is operable in association with a food packing system that packages the food products. The apparatus comprises a marking device located in proximity to the food packing system so that the marking device can form markings thereon.

A preferred embodiment includes an apparatus for applying markings on eggs that is operable in association with an egg-handling machine that performs washing, candling, grading, and packing of eggs. The apparatus comprises a marking device located in proximity to the egg-handling machine, so that the marking device can form the markings. In a preferred embodiment, the egg has a marking applied thereon, wherein the marking is formed at least in part by discolored material on the egg shell. The egg may include the marking being formed entirely by discolored material of the egg shell. The egg may also be raw or pasteurized. The markings may be formed by a generally stationary marking device as the egg is transported past the marking device.

In some embodiments, the method and system for applying markings on food products, comprises conveying the food product to a marking station having at least one laser marking device configured to apply laser energy of sufficient intensity to etch indicia on the food product, and activating the laser device to apply laser energy to the food product and etch the indicia thereon. The markings may include text, graphics, images, other types of indicia, and any combination thereof. In a preferred embodiment, the food product is an egg, and the laser etches the indicia on the outer surface of the shell of the egg. The applied laser energy may ablate and/or discolor the surface of the egg shell to an approximate depth that is within the range of about 5 to about 25 micrometers. The structural integrity of the egg shell is not affected because the etching by the beam only affects the outer approximately 5 to approximately 25 micrometers of the egg shell, which is approximately 1.5% to approximately 8% of the thickness of the egg shell.

In accordance with embodiments herein, the food products may be examined at selected times, selected stages of the processing operations, with respect to selected food product characteristics, environmental conditions, processing conditions, or performance parameters, with respect to selected compliance requirements, or any combination thereof. The environmental conditions, processing conditions, the marking process performance parameters, and the like, or any combination thereof, of the marking process may be adjusted in response to such examination.

In a preferred embodiment, the method and system include a machine vision system that is used in connection with the food processing operations to examine and analyze the eggs being processed. The machine vision system is configured and arranged so as to examine the position and characteristics of the eggs that are to be marked and/or the quality and integrity of the information that is to be marked on the eggs. Image data obtained may be stored in memory local to the processing operations and/or remotely by any suitable means. The image data may be accessed and analyzed by any suitable means to determine any variations, trends, problems, and the like. In the preferred embodiment, the machine vision system includes a calibration device and associated method allowing self-correction of the system for system environmental conditions such as mechanical position, ambient lighting, lens dirtiness, and the like.

Still other advantages, aspects and features of the subject disclosure will become readily apparent to those skilled in the art from the following description wherein there is shown and described a preferred embodiment of the present disclosure, simply by way of illustration of one of the best modes best suited to carry out the subject disclosure As it will be realized, the present disclosure is capable of other different embodiments and its several details are capable of modifications in various obvious aspects all without departing from the scope herein. Accordingly, the drawings and descriptions will be regarded as illustrative in nature and not as restrictive.

BRIEF DESCRIPTION OF THE DRAWINGS

The accompanying drawings incorporated herein and forming a part of the specification illustrate the example embodiments.

DETAILED DESCRIPTION OF THE PREFERRED EMBODIMENTS

Figure 1:
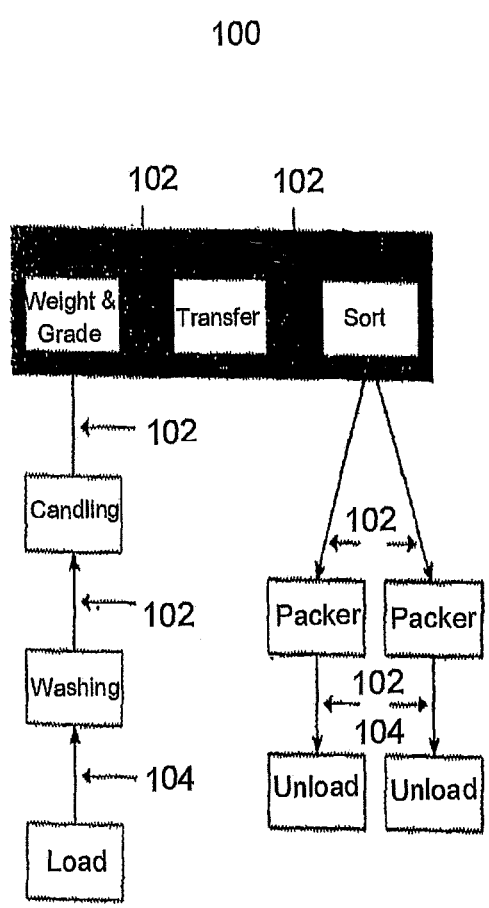
FIG. 1 is a block diagram depicting portions of an egg-handling machine and particularly illustrating inline and offline operations.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In general, the embodiments herein provide methods and systems for monitoring food product processing operations and facilities. The food products are examined and/or analyzed with respect to the quality and integrity of the processing thereof, any markings applied thereto, and compliance with commercial, regulatory, or customer requirements, and the like. The food products may be examined at selected times, selected stages of the processing operations, with respect to selected food product characteristics, environmental conditions, processing conditions, or performance parameters, with respect to selected compliance requirements, or any combination thereof. The environmental conditions, processing conditions, the processing performance parameters, and the like, or any combination thereof, to which the food products are subjected may be adjusted in response to such examination.

While reference is made herein to eggs in particular, it should be understood that this disclosure is directed to monitoring processing operations for any suitable food product, including food products for human consumption and/or animal consumption. In the example embodiment, there is provided a method and system for monitoring egg processing systems, and adjusting parameters in response to such monitoring. However, it is to be appreciated that the embodiments of the claims herein are not limited in any way to the example embodiment, but rather are to be interpreted to cover processing operations for other suitable food products.

In a preferred embodiment, the present disclosure includes a method and system for monitoring food product processing operations, wherein such processing operations include applying markings on the food product. The marking are applied in such a manner to form a permanent marking thereon. The markings may include text, graphics, images, other types of indicia, and any combination thereof. The markings are applied by any suitable marking device known in the art, such as laser-based or ink-based technologies. Desirably, the marking is applied so as to leave much of the area of the food product unaffected so as to form contrast between the unaffected areas and the marking. The method preferably forms the markings on the food product while the product moves through a predetermined region of a food processing system. The performance or characteristics of the marking device may be adjusted in response to selected characteristics of the food product, environmental conditions, processing conditions, compliance requirements, and the like, in order to optimize the marking process.

It is further understood that the preferred embodiment for applying a marking on eggs is by applying a radiant energy source to the shell of the egg so as to cause discoloration of the egg shell to form a permanent marking thereon. However, it is to be appreciated that the embodiments contained herein are not limited to the preferred embodiments, but rather are to be interpreted to cover applying markings by any suitable marking device.

It should be understood that the terms "marking" or "etching" or "printing" as used herein are intended to mean that a laser is employed as a radiant energy source. The laser beam is applied to leave most of the egg shell unaffected so as to provide contrast between the unaffected areas and the marking. The laser beam discolors and/or ablates the outer surface material from the egg shell. A significant benefit of the use of laser marking is that brown eggs have etched indicia that is a contrasting white color, while white eggs have etched indicia that is a contrasting dark brown color. The structural integrity of the egg shell is not affected because the etching by the beam only affects the outer approximately 5 to approximately 25 micrometers of the egg shell, which is approximately 1.5% to approximately 8% of the thickness of the egg shell.

In the preferred embodiment in which a radiant energy source is used, no foreign material is required to be added to the egg shell in order for the radiant energy to discolor the egg shell. Thus, no foreign material, such as ink or radiant energy sensitive material that could react with the radiant energy needs to be added to form a marking. The radiant energy is applied to the natural eggshell. Thus, the marking most desirably is formed solely by the effect of the radiant energy on the normally occurring materials of the eggshell itself. This provides several significant benefits. The egg can be properly represented to the consumer as a product with no additives or contaminants. Moreover, because it is not necessary to apply additional materials for purposes of the marking process, it is unnecessary to add the equipment needed to coat the egg with a foreign substance. This greatly simplifies the task of performing the process inline in the production environment of an existing high-speed egg handling apparatus. Additionally, the potentially significant cost of such additional materials is avoided.

In a method according to a preferred embodiment of the present disclosure, a radiant energy source in proximity of an egg directs radiant energy towards the egg. Radiant energy source desirably includes a laser such as a $CO_2$ gas laser adapted to provide light at a wavelength between 9.0 and 10.7 microns, at a minimum of 25 watts, and a projected maximum of 200 watts radiated power, in a beam projected from approximately 80 mm to 180 mm at the surface of the egg. When operated in this power range, the beam ablates and/or discolors the outer surface material from the egg shell. The structural integrity of the egg shell is not affected because the etching by the beam only affects the outer approximately 5 to approximately 25 micrometers of the egg shell, which is approximately 1.5% to approximately 8% of the thickness of the egg shell. The beam is directed onto those areas of the egg, which are to be discolored and turned on and off so as to provide a series of pulses, the beam being "on" for up to about 60 milliseconds during each pulse. During this pulsed actuation, the beam is swept across those areas of the egg surface, which are to be discolored. The sweeping motion may be performed in any manner which will provide the desired relative motion of the beam and the egg. Since the preferred embodiments will operate in association with an egg-handling machine which moves eggs at an extremely rapid speed, the beam must be rapidly moved to produce the desired indicia and also may compensate for the speed of movement of the eggs past the laser apparatus, which is preferably stationary. For example, the radiant energy source may include a beam-sweeping unit incorporating conventional optical elements such as movable or variable lenses, mirrors or prisms adapted to deflect the beam and to vary the deflection with time. Suitable radiant energy sources include, but are not limited to, Sealed $CO_2$ Gas Lasers, Slow-flow $CO_2$ Gas Lasers, TEA $CO_2$ Mask Lasers, $CO_2$ Gas Lasers, UV Gas Lasers, solid-state visible light lasers, and Mid-IR Solid State Lasers. In other embodiments, the radiant energy source may be also be a YAG-type and/or fiber laser system, and may be coupled with a frequency multiplying optical element.

In a method according to an embodiment of the present disclosure, an egg moves through a portion of an egg-grading machine. An egg-grading machine grades the quality of the eggs, and may also transport the eggs towards a packaging machine. Egg-grading machines will move the egg along a path. Somewhere along the path, and preferably immediately before the eggs are packed, a predetermined region can be selected where the egg will pass through and radiant energy can form markings on the egg. Typically, egg-grading machines have calipers that hold the eggs at some point in the path of the egg-grading machine. The marking device may be placed in proximity to this point when the eggs are held so that the marking device forms the markings on an egg as it passes through this predetermined region. This eliminates any need for a special apparatus to position the egg. In this way the method is performed inline with the egg-grading machine.

In another embodiment of the present disclosure, a marking device may be placed in proximity of an existing egg-handling machine. Egg-handling machines includes any device or apparatus that will control the movement of an egg along a path, including egg-grading machines. The marking device can be placed in proximity to the egg-handling machine so that the markings may be applied to the egg inline. The egg-handling machine moves an egg along a conveyor apparatus in a particular direction. A marking device is placed in proximity to the conveyor apparatus such that marking device is directed towards egg.

There are many variations of egg-handling machines. Most perform some common minimal basic functions. FIG. 1 is a block diagram outlining the basic functions of those machines. The eggs move through these machines 100 while these basic functions are performed, and a radiant energy source can be placed inline 102 or offline 104 in between many of these functions to perform a method of the present disclosure. The eggs are loaded into the machine. An offline procedure may be performed after this function. The eggs are then washed, after which an inline method may be performed. The eggs are candled, after which an inline method may be performed. The eggs move to the grading portion of the machine where they are weighted and graded, after which an inline method may be performed. The eggs are then transferred to a sorter, before which an inline method may be performed. The eggs are then sorted by grades and sizes, after which an inline method may be performed. The eggs are placed into a package, after which an inline method may be performed. An offline process 104 can be performed prior to the load processor and, typically involves human intervention or some other form of mechanical intervention alien to the egg-handling machine. In preferred embodiments of the present disclosure, the marking device can be associated with an existing egg-handling machine without appreciably modifying the machine. The egg-handling machine preferably includes sensors or other suitable monitoring devices for monitoring the operational and environmental parameters of the egg-handling machine.

Figure 2:
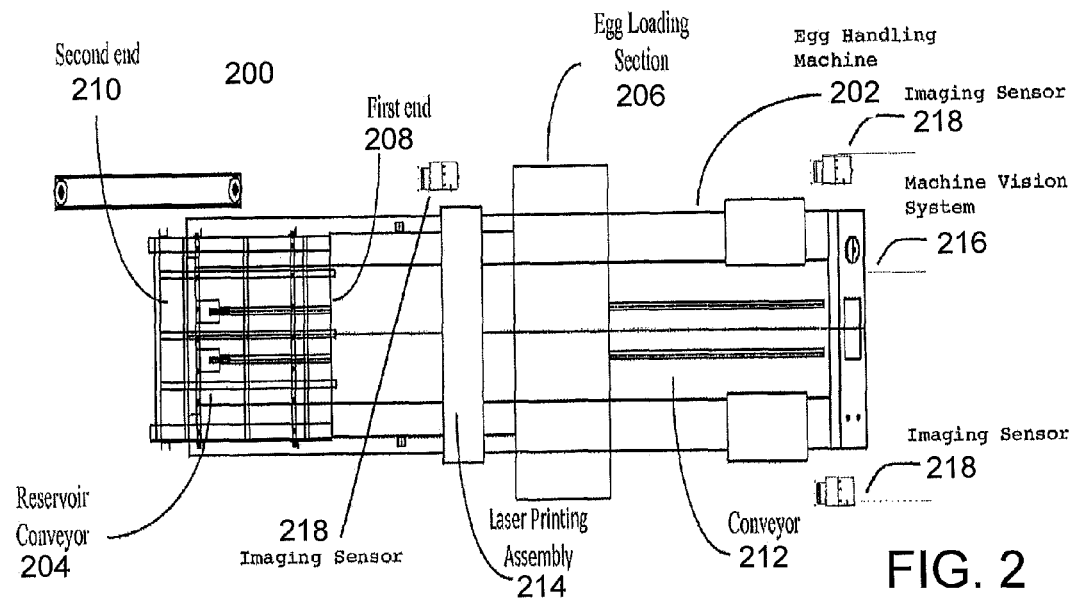
FIG. 2 is a diagrammatic view depicting an apparatus for performing an embodiment of the method of the present disclosure.
Figure 3:
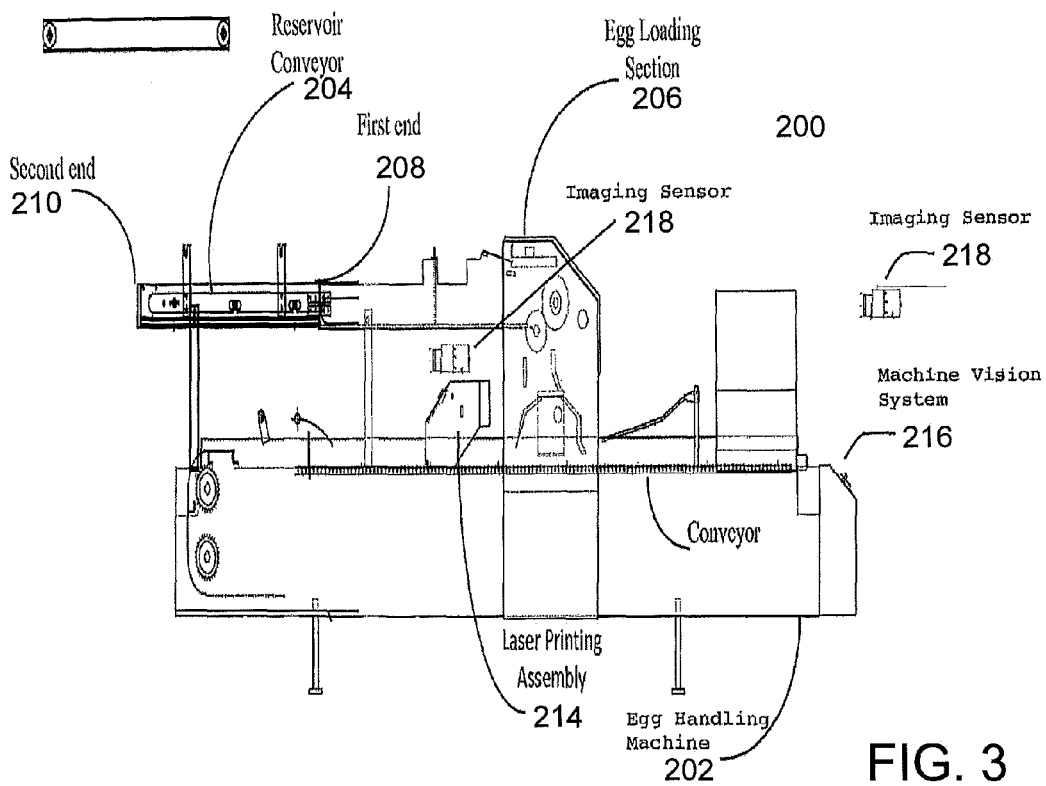
FIG. 3 is a diagrammatic view depicting an apparatus for performing an embodiment of the method of the present disclosure.

FIG. 2 illustrates a top-view of a system diagram of an example embodiment of a marking apparatus 200 that is operable in association with an egg-handling machine 202 that performs washing, candling, grading, and packing of eggs as discussed above. The apparatus includes at least one laser printing assembly 214 comprised of at least one laser source operable to apply laser markings on eggs. FIG. 3 illustrates a side view of the system diagram of an example embodiment of a marking apparatus 200 that is operable in association with egg-handling machine 202. While reference is made herein to eggs in particular, it should be understood that the same principles and features may be applied to an apparatus for applying marks on other suitable food products. Further, while reference is made to a laser printing assembly comprised of at least one laser source, it should be understood that any suitable marking device may be used, such as an ink-based printing assembly comprised of at least one ink-based printing head.

A reservoir conveyor 204 is connected to an egg loading section 206 of the egg handling machine 202 at first end 208 and an egg grading machine (not shown) at second end 210. In an example operation, eggs are passed from the egg grading machine (not shown) to the reservoir conveyor 204 via the second end 210. The reservoir conveyor 204 then passes the eggs along the conveyor to the first end 208 and then to the egg loading section 206. The egg loading section 206 then receives an egg package (not shown) along a conveyor 212 and then deposits a plurality of eggs into the egg package. The eggs are deposited in the egg package such that the egg package is open and at least a portion of each of the eggs is accessible. In most instances, at least a portion of the eggs extend above the open egg package. Typically the eggs do not travel continuously down the conveyor belt of conveyor 212. Instead as each set of eggs are placed in the egg package at the egg loading section 206, a pause in the conveyor belt of the conveyor 212 occurs. During this pause or dwell time, the at least one laser source in the laser printing assembly 214 prints data on at least one of the eggs in the open egg carton. Preferably, the at least one laser source prints data on each of the eggs in the open egg carton.

The laser printing assembly may be configured on various configurations depending on the markings to be applied onto the eggs and the egg processing speed required in different embodiments or environments. For example, in one embodiment, the laser printing assembly 214 may be situated at the side of the conveyor 212 at a position where a portion of the egg carton is located below the at least one laser source. In another embodiment, the at least one laser source or associated beam delivery or beam deflecting or beam focusing elements may be mounted on a linear slide in the laser printing assembly 214 that moves parallel to the row of eggs during the dwell time of the conveyor belt and perpendicular to the direction of the conveyor belt of the conveyor 212. Thus, the at least one laser source prints from above the eggs contained in the egg package. The markings may include text, graphics, images, other types of indicia, and any combination thereof. In a preferred embodiment, the markings include freshness information, traceability data, or other types of relevant source information, or any combination thereof. In those embodiments in which the laser source prints from above the eggs, egg debris and/or broken eggs will not fall onto the laser source and therefore, will not cause downtime or impede print quality.

It is be understood that the at least one printing assembly may be positioned at any suitable location for marking on the food products and that the location referenced herein is only for example purposes. Further, the apparatus may include multiple printing assemblies and such printing assemblies may be configured or positioned as required for effective processing.

Figure 4:
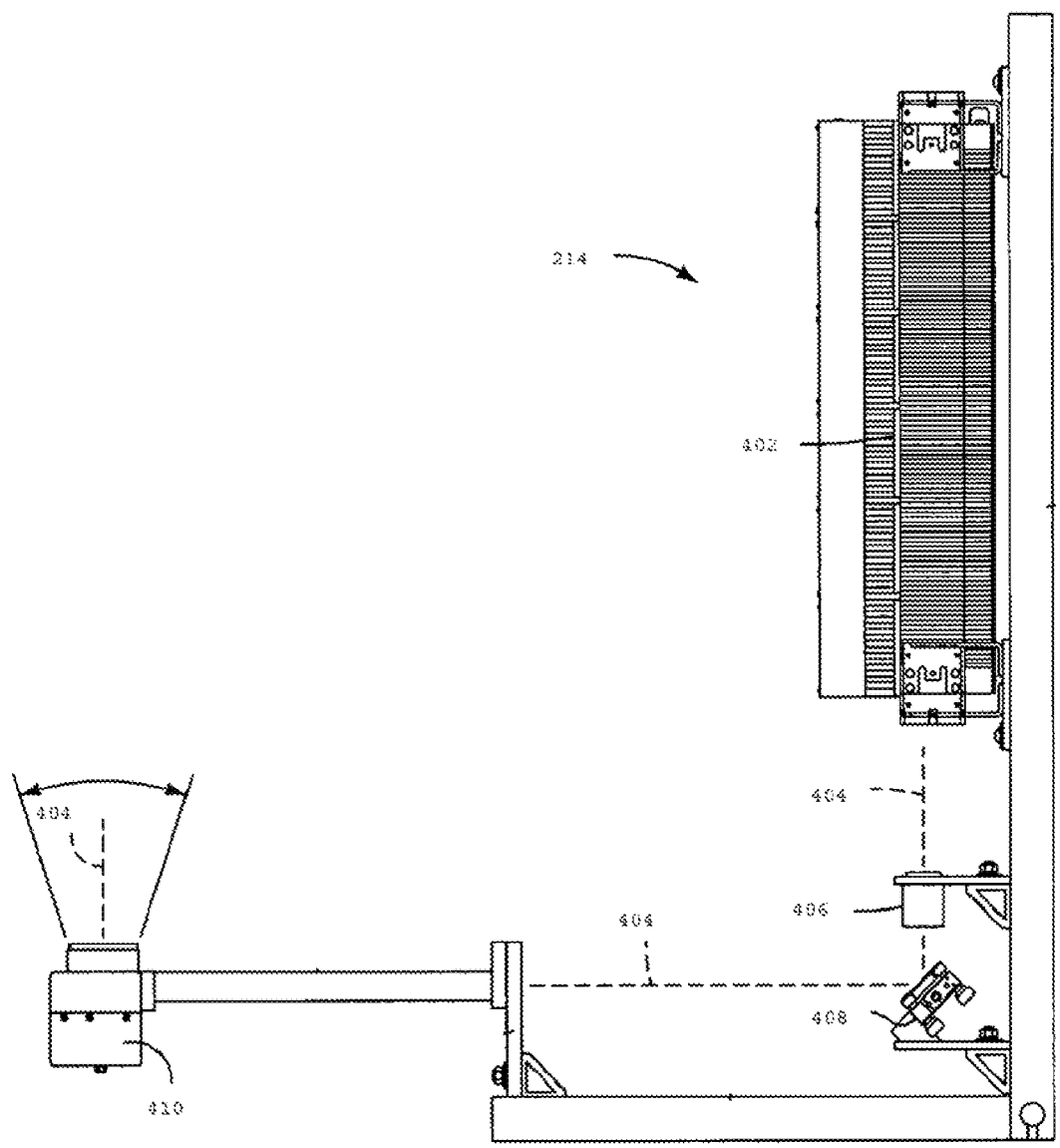
FIG. 4 is a diagrammatic view depicting a laser printing assembly for performing an embodiment of the method of the present disclosure.

FIG. 4 is a diagram of one embodiment of the laser printing assembly 214 of FIGS. 2 and 3. The laser printing assembly 214 includes at least one laser source 402. The laser source 402 outputs a laser beam 404 that passes through a collimating and focusing lens 406, is then reflected off of mirror 408 to a galvanometer scanning head 410 that directs the laser beam to a specific location on the eggs passing thereunder. The laser printing assembly 214 may also include other components as necessary to interact with the apparatus 200 and apply the desired laser markings to the eggs. The laser printing assembly, which includes at least one laser source, preferably has vector scan and raster scan capability for applying the desired markings to the eggs. The laser printing assembly is in communication with an associated computer, controller, central processing unit, or the like ("computer system") that controls the operation of the laser printing assembly and the at least one laser source contained therein.

Figure 5:
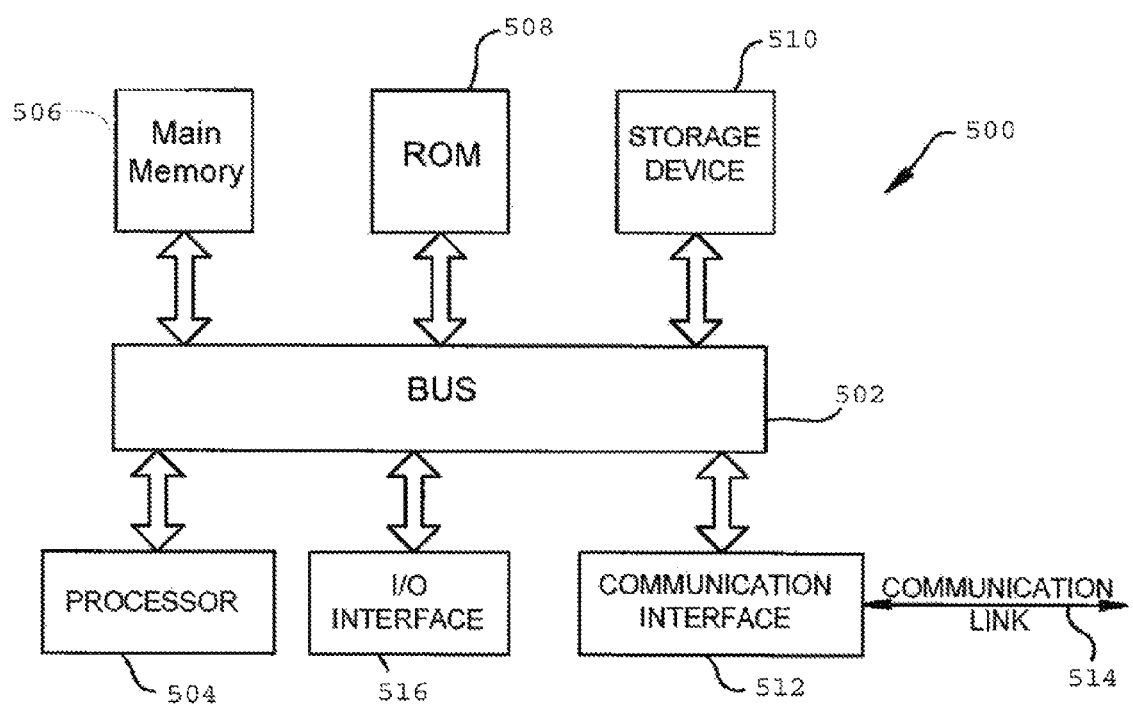
FIG. 5 illustrates an example of a computer system 500 upon which an example embodiment may be implemented.

FIG. 5 illustrates an example of a computer system 500 upon which an example embodiment may be implemented. Computer system 500 is suitable for implementing the functionality of any embodiment of the apparatus 200 described herein in FIGS. 2 and 3.

Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, optical disk, SD memory and/or flash storage, is provided and coupled to bus 502 for storing information and instructions.

An aspect of the example embodiment is related to the use of computer system 500 to implement the method and system for monitoring food product processing operations, such as applying markings to food products. According to an example embodiment, instructions are provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hardwired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 504 for execution. Such a medium may take many forms, including but not limited to non-volatile media, and volatile media. Non-volatile media include, for example, optical or magnetic disks, such as storage device 510. Volatile media include dynamic memory, such as main memory 506. As used herein, tangible media may include volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read. Various forms of computer-readable media may be involved in carrying one or more sequences of one or more instructions to processor 504 for execution. The instructions may optionally be stored on storage device 510 either before or after execution by processor 504.

The computer system 500 also includes a communication interface 512 coupled to bus 502, for providing a two-way data communication coupling computer system 500 to communication link 514. Communication link 514 typically provides data communication to other networks or devices. Although the illustrated example has one communication interface 512 and one communication link 514, those skilled in the art should readily appreciate that this is for ease of illustration, as the example embodiments described herein may have any physically realizable number of communication interfaces 512, and/or communication links 514. The server 500 may further include at least one input/output interface 516 connected to the bus 502 and in data communication with one or more user interface devices, such as a mouse, keyboard, monitor/screen, etc. (not explicitly shown).

Notably, while the illustrative embodiment described below shows a single computer system as performing the functions described herein, it is understood that the computer system 500 may comprise, either as a single computer system or as a collection of computer systems, one or more memories, one or more processors, and one or more network interfaces etc., as may be appreciated by those skilled in the art.

The computer system 500 is operable to control the operation of the printing assembly and the at least one printing source contained therein. The computer system 500 is also operable to receive and/or generate data files for producing or generating movement of the marking device to produce the desired markings. The computer system 500 is operable to control various parameters of the marking device, enabling optimization of the performance the marking device in accordance with the quality data obtained from the monitoring and management of the printing process.

In a preferred embodiment, the computer system 500 is operable to control the operation of the laser printing assembly and the at least one source contained therein. The computer system 500 is also operable to receive and/or generate data files containing vector and/or rector information for producing or generating movement of the marking device to produce the desired markings. The computer system 500 is operable to control various parameters of the laser beam, such as power, spot size, spot area, laser speed, pulse width, pulse frequency, and/or modulation frequency. This enables optimization of laser performance with respect to desired resolution, quality, integrity, regulatory compliance, and the like of the applied marks. The magnitude and character of these parameters may be associated with the vector and raster information and stored in memory and programmably varied according to the desired results.

The computer system 500 is preferably interconnected with other computer systems, sensors devices, and other devices associated with other machines, systems, networks, and the like that interact with the apparatus 200 as set forth in FIGS. 2 and 3. For example, the computer system 500 is preferably interconnected with the computer system that controls and monitors the operation of the egg-handling machine 202. The computer system preferably receives environmental and product information from the egg-handling machine, such as wash water temperature, rinse water temperature, wash water pH values, egg origin and characteristic information, and the like. The computer system also preferably receives information from position sensors which monitor the operating status of all important moving components of the apparatus 200.

In one embodiment, the environmental information, product information, positional information, and other relevant processing information may be obtained using image capturing devices, machine-readable or human-readable sensors and identifiers, radio frequency identification transponders (RFID) or other transmitting sensors, time stamps or biometric identification, object recognition, texture definition, database management, and other software, data interface equipment consisting of serial, parallel, or network communication, binary data such as switches, gates, push buttons, current sensors, as well as additional forms of data input. The computer system 500 processes the obtained data and uses such data in the control and operation of the printing assembly as well as the associated egg-handling machine. By adjusting the characteristics of the marking applied thereon, a more consistent mark is achieved and variations of marking quality, resolution, integrity, regulatory compliance, and the like between different types of eggs, environments, and the like may be reduced and/or eliminated.

Egg origin and characteristics of the eggs on which the laser marking is to be applied, or the environmental or processing conditions to which the eggs are subject, may affect the quality of the mark to be applied thereon. These factors include, but are not limited to:

Shell composition (chemical);
Shell composition (mechanical features);
Shell thickness;
Percentage of cuticle remaining;
Shell strength;
Species of bird (chicken, ducks, turkeys, etc.);
Breed of bird;
Feed for bird;
Water source for bird;
Barn temperature;
Molt cycle;
Age of bird;
Age of the egg
Color of egg;
Egg weight (individual and package);
Egg grade;
Egg surface temperature at time of lasing;
Egg wetness at time of lasing;
Egg internal temperature at time of lasing;
Thermal conductive coefficient of egg shell;
Curvature of egg relative to the marking;
Egg washing process parameters;
Egg rinsing parameters;
Egg drying parameters;
Temperature and humidity in the packing facility;
Time of day;
Egg packaging parameters;
Peak temperature reached;
Degree of focus of the laser during marking;
Movement of egg during marking;
Temperature of air local to marking point; and
Effectiveness of vacuum system.

Data relating to the characteristics associated with eggs or the processing or environmental conditions may be obtained by any suitable means. For example, the egg origin and characteristic information of the eggs may be obtained from the source providing the eggs, inspection/examination prior to the processing, data obtained from previous processing of similar types of eggs, data received or obtained by the computer system 500 during monitoring of the marking process, or any other means. Data relating to the environmental conditions, processing parameters, and the interaction of the laser with the egg shell may be obtained from previous processing of similar types of eggs, data received or obtained by the computer system 500 during monitoring of the marking process, or any other means. The computer system preferably stores the data in memory and uses such data as necessary in the control and operation of the laser printing assembly as well as in the control and operation of the egg-handling machine.

In accordance with an embodiment of the present disclosure, the performance or characteristics of the laser may be adjusted in response to selected characteristics of the food product in order to optimize the marking applied thereon. Further, the interaction of the laser with the food product may be monitored by any suitable means as discussed herein and the depth or other characteristics of the laser marking may be adjusted in response to such parameters. By adjusting the depth or other characteristics of the laser marking applied thereon, a more consistent mark is achieved and variations of marking quality between different types of eggs, environments, and the like may be reduced and/or eliminated.

The laser performance parameters may be suitably set or adjusted based on the egg characteristics, environmental conditions, processing conditions, interaction with the laser and the egg shell, and combinations thereof. In a preferred embodiment, the computer system 500 controls various parameters of the laser printing assembly and the at least one laser source to optimize the laser marking process. The parameters that may be set or adjusted include, but are not limited to:

Laser power;
Spot size;
Depth of field;
Speed of traverse of the laser beam over the surface of the object being marked;
Number of passes;
Dwell-time between passes;
Power settings within/between passes;
Spot size of laser beam within/between passes;
Speed of traverse within/between passes;
Order of passes;
Dwell-time in corners of characters;
Configuration of character fonts;
Configuration of any graphical objects to be marked;
Localized heat buildup;
Laser pulse frequency; and
Laser wavelength.

The laser performance parameters may be set or adjusted prior to the laser marking process, during the laser marking process in response to data obtained during processing, or any combination thereof. The laser performance parameters may be set or adjusted per egg, per batch, per run, or any combination thereof. Preferably, the laser performance parameters are adjusted to optimize the laser marking applied thereon such that a more consistent marks is achieved and variations in marking quality are reduced and/or eliminated.

Figure 6:
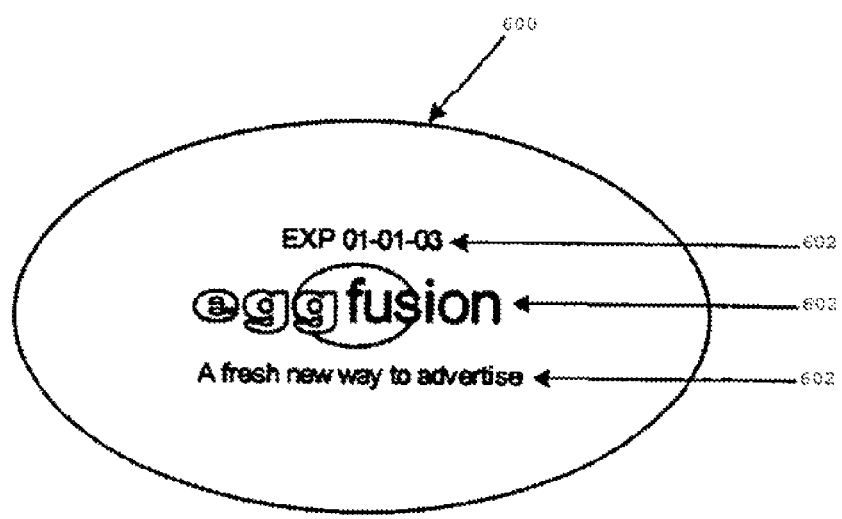
FIG. 6 is a diagram depicting an egg bearing markings using method and apparatus embodiments of the present disclosure.

FIG. 6 is a diagram illustrating an egg 600 having indicia laser marked thereon 602 in accordance with the present disclosure. The information marked thereon may include text, graphics, images, other types of indicia, and any combination thereof, and can include an advertisement or other promotional information, freshness information, traceability data, or other types of relevant information.

Figure 7:
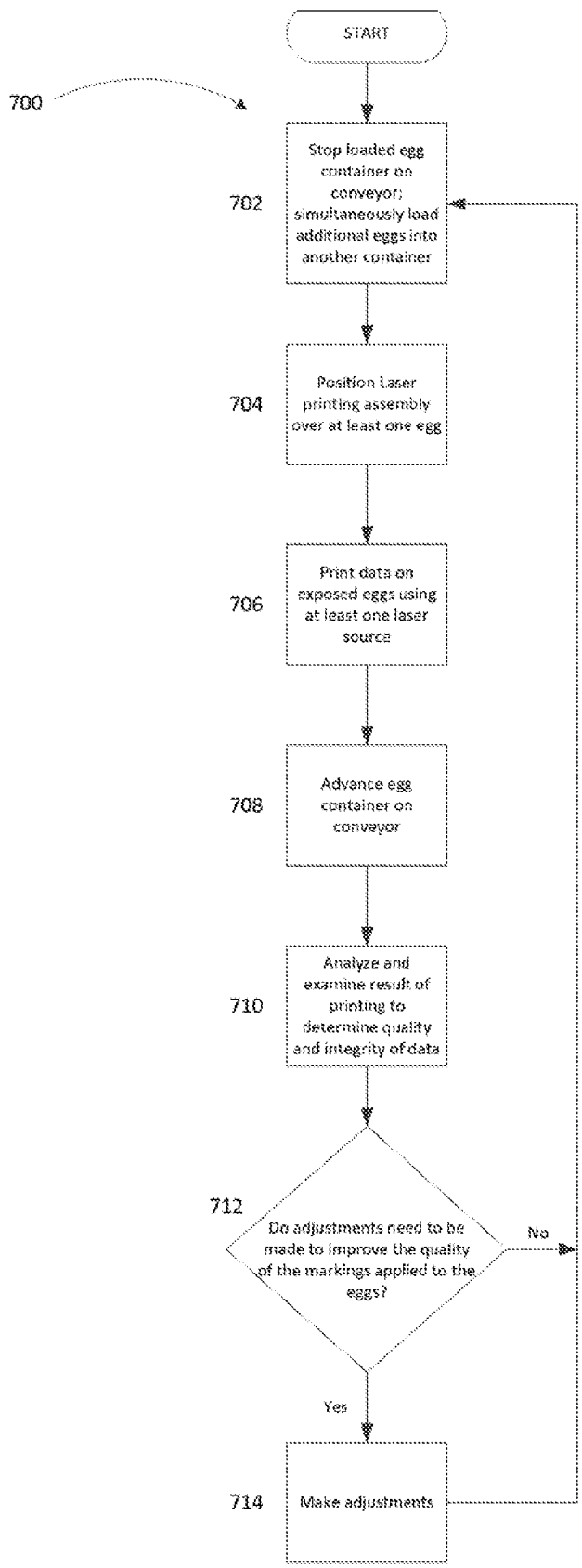
FIG. 7 is an example flow diagram of marking on eggs with the apparatus as shown in FIGS. 2 and 3 in accordance with an example implementation.

FIG. 7 is an example flow diagram 700 of laser marking on eggs with the apparatus 200 as shown in FIGS. 2 and 3 in accordance with an example implementation. An egg carton stops for a predetermined period of time under the egg loading section 206 which loads the eggs into an egg container. Simultaneously while an egg container is being loaded by the egg loading section 206, a loaded egg container is stopped on the conveyor 212 under the laser printing assembly 214 as shown at 702. The at least one laser source contained within the laser printing assembly 214 is positioned over at least one egg in the egg container as shown at 704. The at least one laser source prints data onto the exposed eggs in accordance with the desired laser performance parameters as shown at 706. The egg container is then advanced on the conveyor 212 as additional eggs are placed in an egg container by the egg loading section 206 as shown at 708. At 710, the eggs having data printed thereon are analyzed and examined as discussed above to determine the quality and integrity of the data printed thereon as well as the structural integrity of the eggs. In response to such analysis and examination, the computer system 500, or other suitable means, determines if any of the laser performance parameters, environmental conditions, and/or processing conditions need to be adjusted to improve the quality or integrity of the markings applied to the eggs or the marking process as shown at 712. If it is determined that certain parameters and/or conditions need to be adjusted, such adjustments are made by any suitable means as shown at 714. The next container of eggs is then processed according to such parameters and laser marking process continues again as shown at 702. If it is determined that the parameters do not need to be adjusted, the laser marking continues again as shown at 702.

In one embodiment, at least a portion of the eggs are examined or analyzed during and/or after the laser marking process to determine the position and/or characteristics of the eggs that are to be marked and/or the quality and integrity of the information that is marked on the eggs. Any number of environmental and processing conditions may be analyzed to produce a specific optimized or improved marking on the eggs in response to the analyzed conditions. For example, the laser performance parameters may be adjusted by maximizing or increasing the change in color caused by the directed energy from the laser, reducing the localized depth of mark caused by the directed energy on the egg shell, increasing the speed at which such change in color can occur, or improving the consistency of any other parameter that may be determined between one egg and another.

In a preferred embodiment, a machine vision system 216 may be configured and arranged so as to the examine the position and characteristics of eggs that are to be marked and/or the quality and integrity of the information that is marked on the eggs. In some embodiments, one or more machine vision observation units or imaging sensors 218 may be positioned, for example, adjacent the laser printing assembly 214. In other embodiments, the one or more imaging sensors 218 may be located elsewhere to allow for adequate observation. In a preferred embodiment, the machine vision system 216 is operable to control the operation of the one or more imaging sensors 218 and to receive image data obtained from the one or more imaging sensors 218. The machine vision system 216 is also operable to receive and transmit data to the computer system 500.

As used herein, the phrase "imaging sensor" refers to a component of a vision system that captures image data, e.g., a camera or other image capturing device. In machine vision systems, one or more imaging sensors are configured and arranged to capture image data of one or more areas of interest within an operation or facility. Imaging sensors include analog video cameras, digital video cameras, color and monochrome cameras, closed-circuit television cameras, charge-coupled device sensors, complementary metal oxide semiconductor sensors, analog and digital cameras, PC cameras, pan-tilt-zoom cameras, web cameras, infra-red imaging devices, and any other devices that can capture image data. The selection of the particular camera type and selection of the connected machine vision system for a particular facility may be based on factors including environmental lighting conditions, the frame rate and data acquisition rate, and the ability to process data from the lens of the camera within the electronic circuitry of the camera control board, the size of the camera and associated electronics, the ease with which the camera can be mounted as well as powered, the lens attributes which are required based on the physical layout of the facility and the relative position of the camera to the area of interest, and the cost of the camera. In one embodiment, the system can operate a plurality of imaging sensor that gather a plurality of images concurrently. In another embodiment, the system can operate a single imaging sensor that collects images from a plurality of eggs sequentially.

In one embodiment, the system as disclosed herein may be stopped if the machine vision system 216 determines that the mark quality has fallen below a certain threshold. In some embodiments, such a system may be a closed-loop such that feedback from the machine vision system 216 may be used to control the laser printing assembly 214 so as to improve the quality and reliability of the process. For example, feedback from the machine vision system 216 might result in adjustment in the number of passes made, the scan rate, the power level of the laser, etc., in order to ensure a desired contrast level is achieved during the laser marking process. Additionally, or alternatively, the machine vision system 216 may examine the size, color, or other perceptible properties of the eggs to be marked and make appropriate adjustments to the laser performance parameters and/or process to account for such variables and thereby ensure that image quality stays consistent in spite of such variations.

As shown in FIGS. 8-17, in a preferred embodiment, the machine vision system 216 includes at least one imaging sensor 218 that is mounted on a traversing mechanism 802 that allows the imaging sensor to be positioned above any one of the six eggs in a typical row 804 of an egg carton 806. The imaging sensor would be located adjacent the laser printing assembly or any other suitable location that would allow the imaging sensor to perform the desired analysis thereof during and/or after process.

The traversing mechanism 802 is suitably a servo, electric motor, or manually controlled mechanism that allows the imaging sensor to be stopped at any position across an egg carton. This allows the machine vision system to accommodate carton designs with differing X-offsets and/or numbers of eggs in a specific row of the egg carton. The imaging sensor may be moved from column to column of the egg carton as the carton of marked eggs is indexed underneath the imaging sensor.

Figure 10:
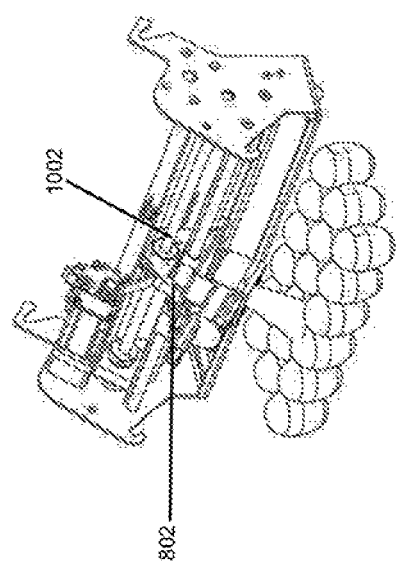
FIG. 10 is a perspective view depicting a machine vision system for performing an embodiment of the present disclosure.
Figure 11:
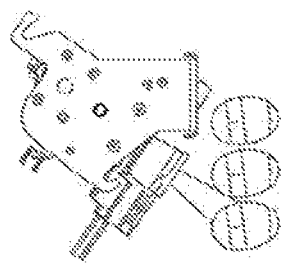
FIG. 11 is an end view depicting a machine vision system for performing an embodiment of the present disclosure.
Figure 8:
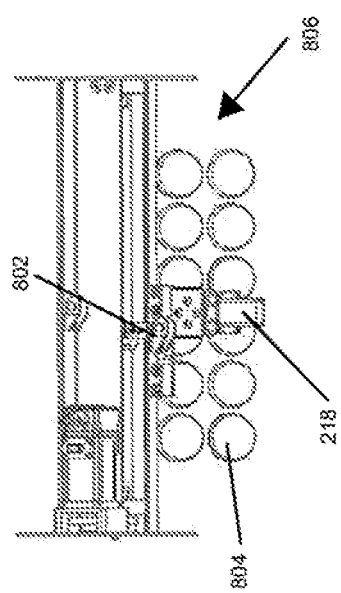
FIG. 8 is a top view depicting a machine vision system for performing an embodiment of the present disclosure.
Figure 9:
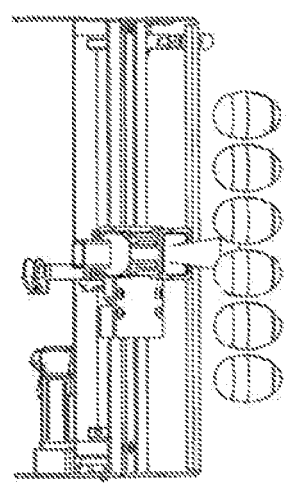
FIG. 9 is a side view depicting a machine vision system for performing an embodiment of the present disclosure.
Figure 13:
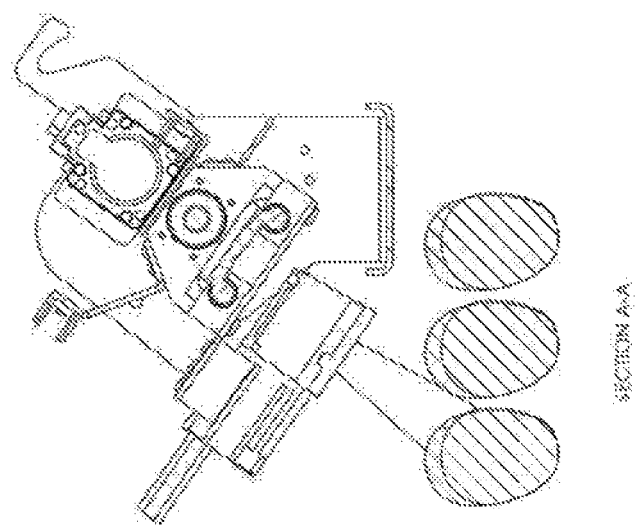
FIG. 13 is an end view depicting a machine vision system for performing an embodiment of the present disclosure along line A-A in FIG. 12.
Figure 12:
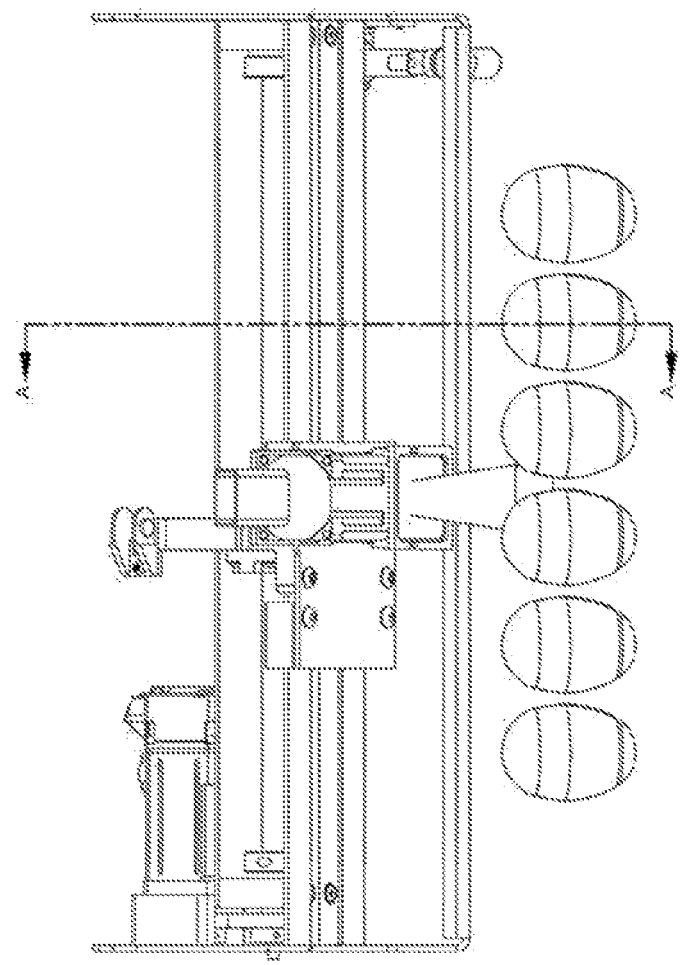
FIG. 12 is a side view depicting a machine vision system for performing an embodiment of the present disclosure.
Figure 14:
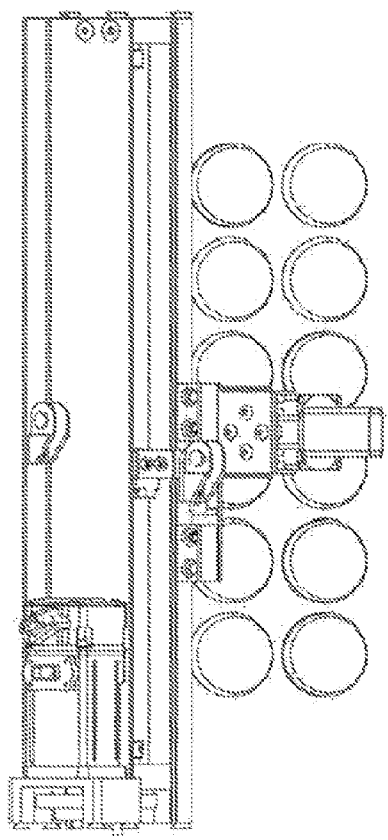
FIG. 14 is a top view depicting a machine vision system for performing an embodiment of the present disclosure.
Figure 15:
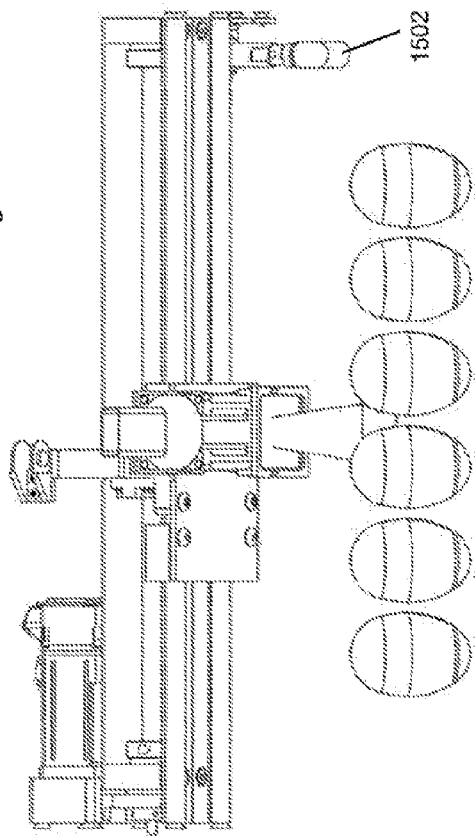
FIG. 15 is a side view depicting a machine vision system for performing an embodiment of the present disclosure.
Figure 16:
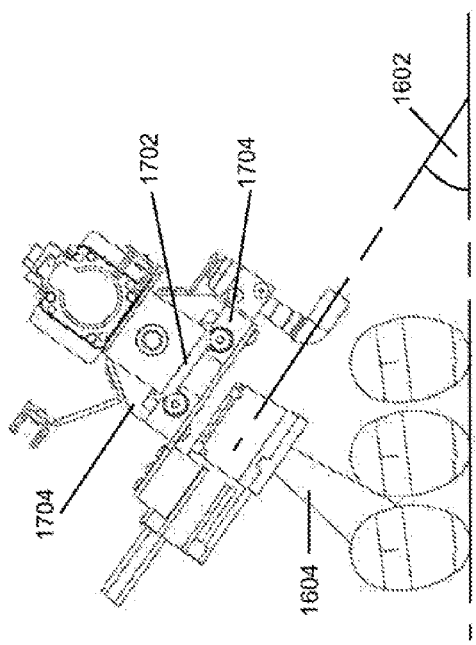
FIG. 16 is an end view depicting a machine vision system for performing an embodiment of the present disclosure.
Figure 17:
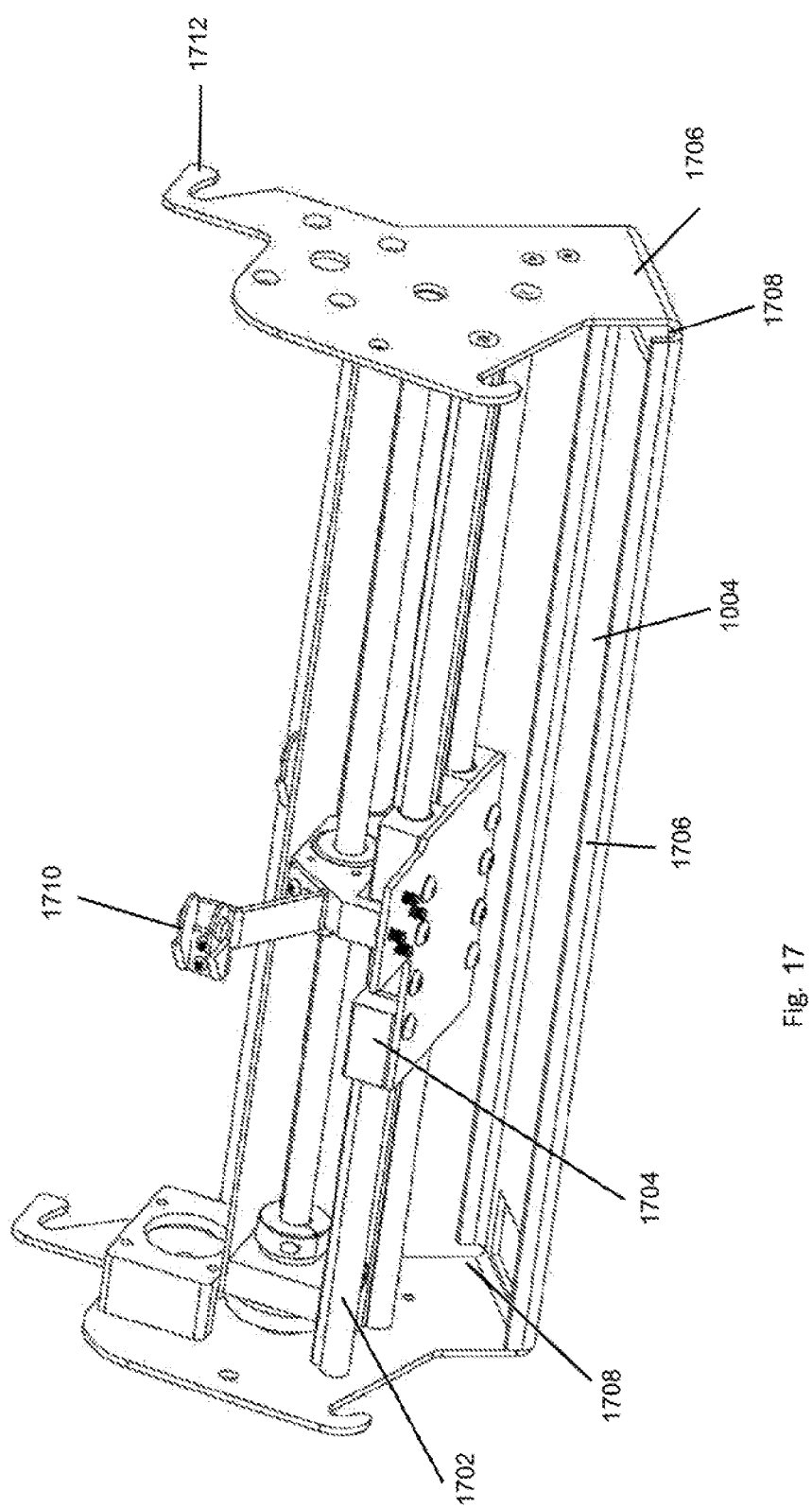
FIG. 17 is a perspective view depicting a machine vision system for performing an embodiment of the present disclosure.

FIG. 10 is a schematic diagram depicting a preferred embodiment of the traversing mechanism 802. The traversing mechanism includes a leadscrew 1002 or other suitable linkage mechanism for connecting an imaging sensor thereto and that can be rotated by an associated servo motor or other motor or other adjustment mechanism. The leadscrew is connected to the imaging sensor by any suitable means. By rotating the leadscrew, the imaging sensor is forced to move in a direction parallel to the axis of the leadscrew.

In a preferred embodiment, the imaging sensor is connected to the traversing mechanism using a linear bearing 1702 with long-life slider blocks 1704. The linear bearings suitably have convex surfaces, thus eliminating slots or other locations that could collect dirt, dust, and debris, thus making it easier to clean in a production environment. The slider blocks clean any accumulated dust or other debris off the slide rails as the imaging sensor is traversed above the egg cartons. Such dirt, dust, and debris may be captured by a horizontal tray 1004 located between the mechanism and the egg cartons, which prevents contamination of the open carton of eggs.

The horizontal tray 1004 is equipped with folded edges on four sides 1706, preventing dust or other debris from passing over the sides of the tray onto the eggs. Additionally, the tray may be provided with slots 1708 in the sides at all four corners where such slots are located outside the guiderails for the egg cartons. Therefore, any accumulated dust, liquid, or other debris cannot fall directly on top of the eggs.

In a preferred embodiment, the angle of the imaging sensor 1602 as mounted on the traversing mechanism is set to match the angle of the lasers relative to the conveyor as the lasers mark the eggs, ensuring that the imaging sensor has the least distorted view 1604 of the mark on the eggs.

In a preferred embodiment, power and communication cables for the imaging sensors may be contained and controlled in a flexible wireway 1710 that traverses with the traversing mechanism. The imaging sensor mounted thereon may include a suitable homing sensor 1502 positioned so as to sense the imaging sensor during its travel, so that the position of the imaging sensor may be determined during operation.

In a preferred embodiment, the traversing mechanism and the imaging sensors mounted thereon may be removed quickly from the egg-handling machine by any suitable means, such as a catch and lift mechanism 1712. Removal of the mechanism allows access to the conveyor and egg cartons under the traversing mechanism. The traversing mechanism is designed to fit within tight space constraints above the egg carton conveyor and the laser marking and fume extraction equipment.

In operation, the machine vision system 216 controls the operation of the imaging sensor in order to obtain image data of the eggs being processed. The image data may be obtained while the egg is in a stationary position relative to the imaging sensor, while the egg is moving relative to the imaging sensor, or combinations thereof.

In one embodiment, the imaging sensor mounted on the traversing mechanism will move to the adjacent column during the next index of the egg carton. In this way, image data for one egg in each row of six is obtained and a representative sample from each column of eggs is inspected every six rows. In certain situations, the imaging sensor may not move to the adjacent column during the carton index to the next row of eggs. The image sensor may not advance to the next column due to a failure to locate the laser marked image on the prior egg, poor quality of mark on the prior egg, or other circumstances. Further, the imaging sensor may be controlled to not move across adjacent columns, but to collect continuous images relating to a specific column of eggs that correspond to a specific laser marking system.

In another embodiment, two or more imaging sensors are mounted on the traversing mechanism. In such embodiment, the movement of the imaging sensors is controlled such that the image data is obtained for multiple eggs in each row. In such embodiment, the movement of the sensors may be controlled to obtain image data for every row, or selected rows as is required.

In another embodiment, six imaging sensors are mounted in a static position above the eggs with a similar viewing angle of the markings on the eggs. In this manner image data is obtained for all six eggs in a row, without requiring a traversing mechanism.

In some embodiments, the machine vision system may also include a calibration device, which may be positioned to one side of the six egg positions, so that the imaging sensor may be moved to a specific position outside of the normal traversing motion, so as to capture an image of the calibration device when located in that specific position. As an example, the image data may indicate that the lens of the imaging sensor is dirty, thus affecting the quality of the images of the markings. Corrective action may then be taken in response thereto, such as cleaning the lens, or offsetting the examination results to account for the dirty lens. Additionally, the calibration device position may be detected within an image generated by the imaging device, and information on the relative position of the calibration device and imaging sensor may be used for homing the mechanism. In this embodiment the homing sensor 1502 may not be required.

In other embodiments, the imaging sensor is positioned to capture image data associated with the operation of the laser marking assembly, the machine vision system, imaging sensors, and the like. For example, the imaging sensor may capture image data of the laser marking assembly during the marking process and such image data is analyzed to determine any defects in its operation. Corrective action may then be taken in response thereto, such as cleaning the lens, or adjusting the laser parameters to account for the dirty lens.

In some embodiments, the system includes artificial light sources operating at certain frequencies of light which result in preferential image capture, such as "Red Light" or "Blue Light." In other embodiments, multiple images are captured under alternating light conditions to allow for better comparative analysis of the image data, such as using multiple images representing the same region of interest under differing lighting conditions. In yet other embodiments, no artificial lighting is required, and ambient lighting suffices.

Artificial illumination sources may be used in connection with the traversing mechanism. In one embodiment, the illumination sources traverse with the imaging sensor. In another embodiment, a static illumination source is used such that the light source is positioned in a manner so as to avoid shadows on the image acquisition regions of interest.

It is understood that it may be undesirable to analyze each egg for cost and processing time reasons. Therefore, in some embodiments, a portion of the eggs processed are routed to a quality analysis station for analysis and examination. The eggs may be routed to such quality analysis station prior to, during, and/or after processing thereof. The eggs are subjected to the analysis and examination as discussed above.

Image data obtained prior to, during, and/or after processing of the eggs is suitably stored in memory for later use. The obtained image data may be stored in memory local to the egg processing facility and/or remotely by any suitable means. The obtained image data may be accessed and analyzed via any suitable means, such as statistical analysis, to determine any variations, trends, patterns, and the like.

In a preferred embodiment, at least a portion of the image data is collected and stored in memory for later use. The image data may be collected, consolidated, and then analyzed for any suitable purpose, such as to improve processing control and output, determine output and performance characteristics, improve, determine trends, determine or verify regulatory compliance, identify risks (i.e., processing conditions, environmental conditions, contamination, source, etc.), support product recall procedures, provide source verification, and the like. Image data may be collected from multiple food products, multiple processing runs on a device or system, multiple marking devices or systems within a processing facility, multiple processing facilities, multiple distribution systems, multiple food sources, and the like, or any combination thereof.

The collected information is then consolidated and stored in memory for later use by authorized users. The consolidated data may be stored locally and/or remotely by any suitable means. In a preferred embodiment, the present disclosure provides a cloud-based system for collecting, consolidating, and disseminating the source information. The image data contained therein may be analyzed with respect to food source location details, food processing facility details, food processing environmental and processing conditions, food product characteristics, food product distribution details, regulatory compliance details, and the like.

Figure 18:
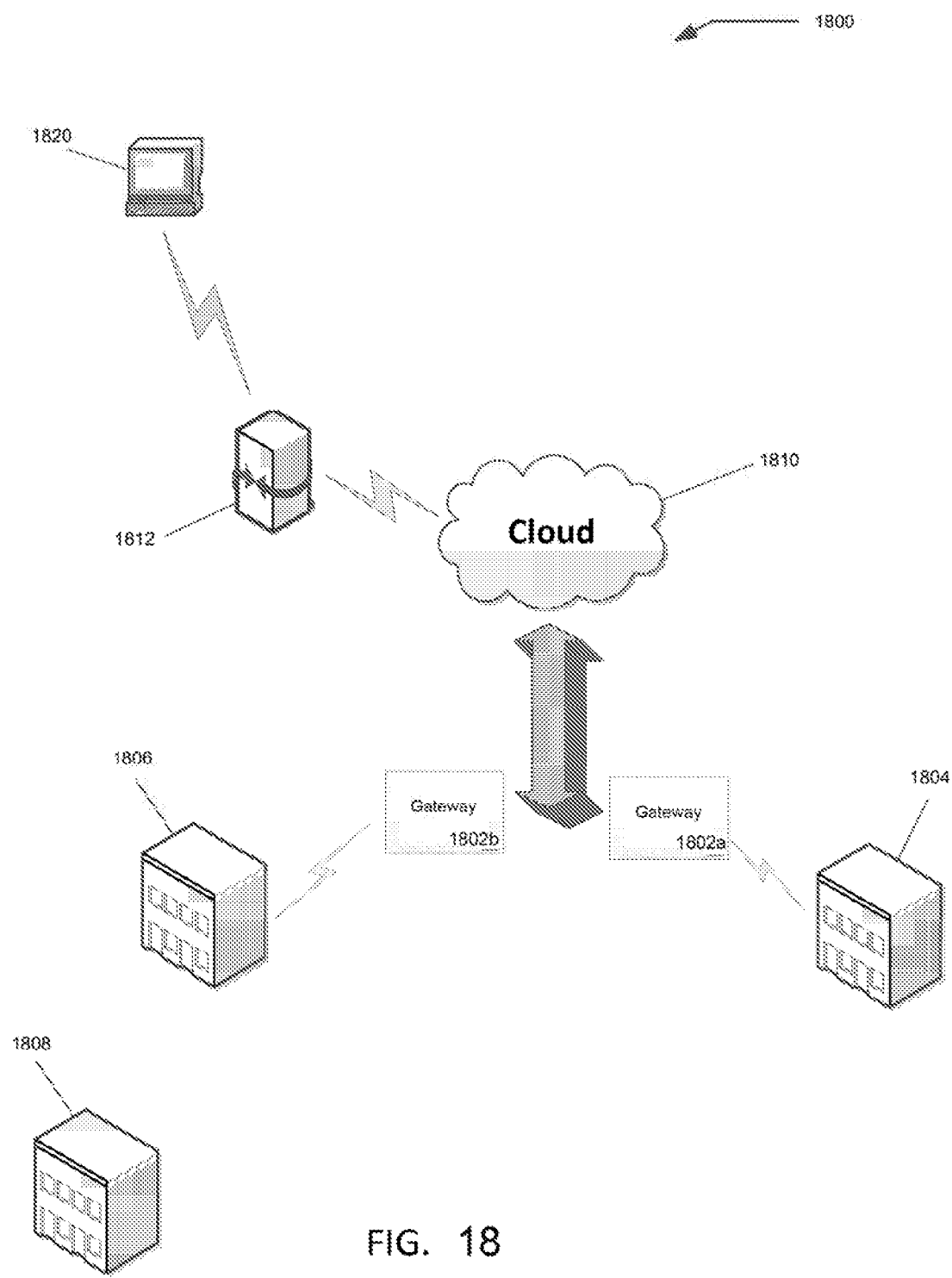
FIG. 18 is a block diagram illustrating an example embodiment of a cloud-based network for remote storage of quality data according to the present disclosure.

FIG. 18 illustrates an exemplary block diagram of a cloud-based approach for connecting numerous remote devices or systems with a remote storage location having a database or other relational storage component for storing image data related to the operation of one or more food product processing systems. As an example embodiment, FIG. 18 illustrates a block diagram 1800 of a cloud-based approach for storing quality data related to eggs processed by one or more egg processing facilities. In FIG. 18, gateway 1802a is in communication with egg processing facility 1804 and gateway 1802b is in communication with egg processing facility 1806. Egg processing facility 1806 also processes eggs received from egg processing facility 1808. Egg processing facility 1808 is an off-line facility that transports eggs to egg processing facility 1806, which in turn processes the eggs and transmits the relevant data to gateway 1802b. For purposes of this example, all three egg processing facilities 1804, 1806, and 1808 may have received nest run eggs. Egg processing facilities 1804 and 1806 will apply markings to at least a portion of the eggs processed therein.

The image data as it is collected, together with related information including the location of the egg being imaged, the time that the image was created, the mark being etched onto the egg at that time, and other information as required for later analysis, may be transmitted through the cloud 1810 to a remote storage location 1812. The collected image data is consolidated and archived, and is available for remote analysis thereof for any suitable purpose, such as determine the quality and integrity of marking processes, to improve processing control and output, determine output and performance characteristics, determine trends, determine or verify regulatory compliance, and the like. In some embodiments, a portion of the collected and/or analyzed data may flow back by way of the cloud 1810 through at least one of gateways 1802a or 1802b to one or more of the egg processing facilities for use thereby. The remote storage location 1812 may be accessible remotely to consumers, retails, egg providers, egg processing facilities, governmental entities, and other interested party by any suitable remote communication device as illustrated by 1820. Preferably, access to the remote storage device is only after suitable authentication and/or encryption processes.

It is appreciated by those skilled in the art that the cloud-based approach shown in FIG. 18 is only an exemplary topology diagram of a cloud-computing methodology and that for purposes of connecting numerous remote devices herein, a cloud-based implementation may take other forms and include other components as necessary.

Having thus described certain embodiments of systems and methods for practicing aspects of the present disclosure, it is to be appreciated that various alterations, modifications, and improvements will readily occur to those skilled in the art. Such alterations, modifications, and improvements are intended to be part of this disclosure, and are intended to be within the spirit and scope of this disclosure.

The invention claimed is:

1. A system for determining the quality of markings applied to individual objects at a marking station while the objects travel along at least one path through a processing system, wherein the marking station includes at least one marking unit positioned adjacent at least one path along which the objects are conveyed, the at least one marking unit operable to mark the objects as the objects pass through the marking station, the system comprising:
    at least one processor;
    at least one image capture device operatively coupled to the at least one processor and controlled in part by the at least one processor, the at least one image capture device positioned adjacent the at least one marking unit, the at least one image capture device operable to capture image data representative of at least one area adjacent to the at least one marking unit, wherein the at least one area is defined such that at least one of objects to be marked by the at least one marking unit, objects marked by the at least one marking unit, and combinations thereof will pass therethrough;
    at least one image analysis unit operatively coupled to the at least one processor and controlled in part by the at least one processor, the at least one image analysis unit operable to analyze at least a portion of the captured image data with respect to at least one of position of objects to be marked with respect to the at least one marking unit, characteristics of objects to be marked, quality of markings which have been applied to the objects, integrity of the objects to which markings have been applied, and combinations thereof, and generate quality data therefrom;
    a non-transient memory operatively coupled to the at least one processor and operable to store data associated with the captured images; and
    at least one input/output interface operatively coupled to the processor;
    wherein the at least one processor is operable to:
        obtain at least one quality data analysis parameter with respect to selected analysis to be performed on at least a portion of the generated quality data;
        analyze at least a portion of the generated quality data in accordance with at least one quality data analysis parameter;

determine an adjustment to be made to least one operational parameter of the processing system based on the analysis of at least a portion of the generated quality data; and adjust the at least one operational parameter of the processing system such that the objects are processed in accordance with the at least one adjusted operational parameter.

2. The system of claim 1, wherein the at least one image capture device is positioned above the path on which the objects are conveyed.

3. The system of claim 2, wherein the at least one image capture device is mounted on a traversing mechanism above the path on which the objects are conveyed, wherein the traversing mechanism is operable to move the at least one image capture device across at least a portion of the path.

4. The system of claim 1, wherein the at least one image capture device is operable to capture image data of objects within the at least one area while the objects are stationary with respect to the at least one image capture device, while the objects are moving with respect to the at least one image capture device, and combinations thereof.

5. The system of claim 1, wherein a plurality of image capture devices are positioned above the path on which the objects are conveyed, and each of the plurality of image capture devices captures image data representative of a discrete area along the path on which the objects are conveyed.

6. The system of claim 1, wherein the at least one image capture device is positioned upstream of the at least one marking unit, downstream of the at least one marking unit, and combinations thereof.

7. The system of claim 1, wherein the at least one processor is operable to store at least a portion of the quality data generated by the at least one image analysis unit in memory.

8. The system of claim 1, wherein at least a portion of the memory is implemented in a cloud-based component communicatively coupled to the at least one processor, and operable to store at least a portion of the data associated with the captured images.

9. The system of claim 1, wherein the processor is further operable to transmit at least at portion of the quality data generated by the at least one image analysis unit to the associated marking station for further analysis thereof.

10. The system of claim 1, further comprising a calibration unit operatively coupled to the at least one processor and controlled in part by the at least one processor, the calibration unit positioned adjacent to the at least one image capture device, the calibration unit operable to capture image data representative of an area in which the at least one image capture device is located, an area in which the at least one image capture device captures image data, and combinations thereof, and wherein the image analysis unit is further operable to analyze at least a portion of the image data captured by the calibration unit.

11. The system of claim 1, wherein the objects to be marked are eggs.

12. A method for determining the quality of markings applied to individual objects at a marking station while the objects travel along at least one path through a processing system, wherein the marking station includes at least one marking unit positioned adjacent at least one path along which the objects are conveyed, the at least one marking unit operable to mark the objects as the objects pass through the marking station, the method comprising:

capturing image data by at least one image capture device from at least one area adjacent to the at least one marking unit, wherein the at least one area is defined such that at least one of objects to be marked by the at least one marking unit, objects marked by the at least one marking unit, and combinations thereof will pass therethrough;

analyzing at least a portion of the captured image data with respect to at least one of position of objects to be marked with respect to the at least one marking unit, characteristics of objects to be marked, quality of markings which have been applied to the objects, integrity of the objects to which markings have been applied, and combinations thereof, and generating quality data therefrom;

obtaining at least one quality data analysis parameter with respect to selected analysis to be performed on at least a portion of the generated quality data;

analyzing at least a portion of the generated quality data in accordance with at least one quality data analysis parameter;

determining an adjustment to be made to least one operational parameter of the processing system based on the analysis of at least a portion of the generated quality data; and adjusting the at least one operational parameter of the processing system such that the objects are processed in accordance with the at least one adjusted opertational parameter.

13. The method of claim 12, wherein the at least one image capture device is positioned above the path on which the objects are conveyed.

14. The method of claim 13, wherein the at least one image capture device traverses across at least a portion of the path.

15. The method of claim 12, wherein image data associated with the objects is captured area while the objects are stationary with respect to the at least one image capture device, while the objects are moving with respect to the at least one image capture device, and combinations thereof.

16. The method of claim 12, the method further comprising storing at least a portion of the quality data generated in memory.

17. The method of claim 12, the method further comprising storing at least a portion of the data associated with the captured images in a cloud-based component.

18. The method of claim 12, the method further comprising transmitting at least at portion of the quality data to the associated marking station for further analysis thereof.

19. An apparatus for determining the quality of markings applied to eggs at a marking station while the eggs travel along at least one path, wherein the marking station includes at least one marking unit positioned adjacent at least one path along which the eggs are conveyed, the at least one marking unit operable to mark the objects as the objects eggs through the marking station, the system comprising:

at least one processor;

at least one image capture device operatively coupled to the at least one processor and controlled in part by the at least one processor, the at least one image capture device positioned adjacent the at least one marking unit, the at least one image capture device operable to capture image data representative of at least one area adjacent to the at least one marking unit, wherein the at least one area is defined such that at least one of eggs to be marked by the at least one marking unit, eggs marked by the at least one marking unit, and combinations thereof will pass therethrough;

at least one image analysis unit operatively coupled to the at least one processor and controlled in part by the at least one processor, the at least one image analysis unit operable to analyze at least a portion of the captured image data with respect to at least one of position of eggs to be marked with respect to the at least one marking unit, characteristics of eggs to be marked, quality of markings which have been applied to the eggs, integrity of the eggs to which markings have been applied, and combinations thereof, and generate quality data therefrom;

a non-transient memory operatively coupled to the at least one processor and operable to store data associated with the captured images; and at least one input/output interface operatively coupled to the processor;

wherein the at least one processor is operable to:
obtain at least one quality data analysis parameter with respect to selected analysis to be performed on at least a portion of the generated quality data;
analyze at least a portion of the generated quality data in accordance with at least one quality data analysis parameter;
determine an adjustment to be made to least one operational parameter of the processing system based on the analysis of at least a portion of the generated quality data; and
adjust the at least one operational parameter of the processing system such that the objects are processed in accordance with the at least one adjusted operational parameter.

20. The apparatus of claim 19, wherein the at least one image capture device is mounted on a traversing mechanism above the path on which the eggs are conveyed, wherein the traversing mechanism is operable to move the at least one image capture device across at least a portion of the path.

* * * * *